Sept. 11, 1962 M. J. SCHREINER 3,053,273
METERING REGULATOR FOR ANHYDROUS AMMONIA
Filed Dec. 2, 1958 2 Sheets-Sheet 1
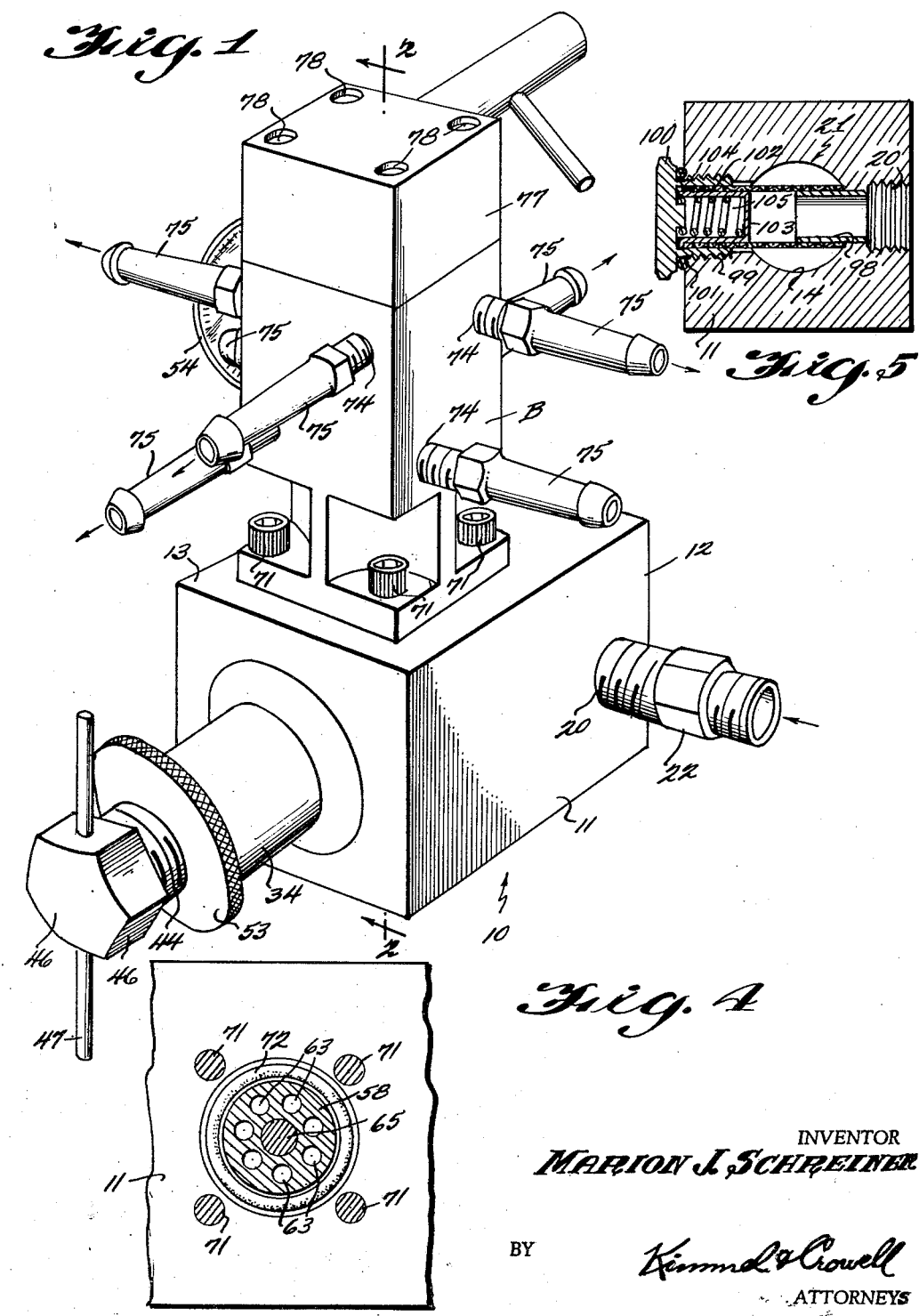
INVENTOR
MARION J. SCHREINER
BY
Kimmel & Crowell
ATTORNEYS Sept. 11, 1962
M. J. SCHREINER
3,053,273
METERING REGULATOR FOR ANHYDROUS AMMONIA
Filed Dec. 2, 1958
2 Sheets-Sheet 2
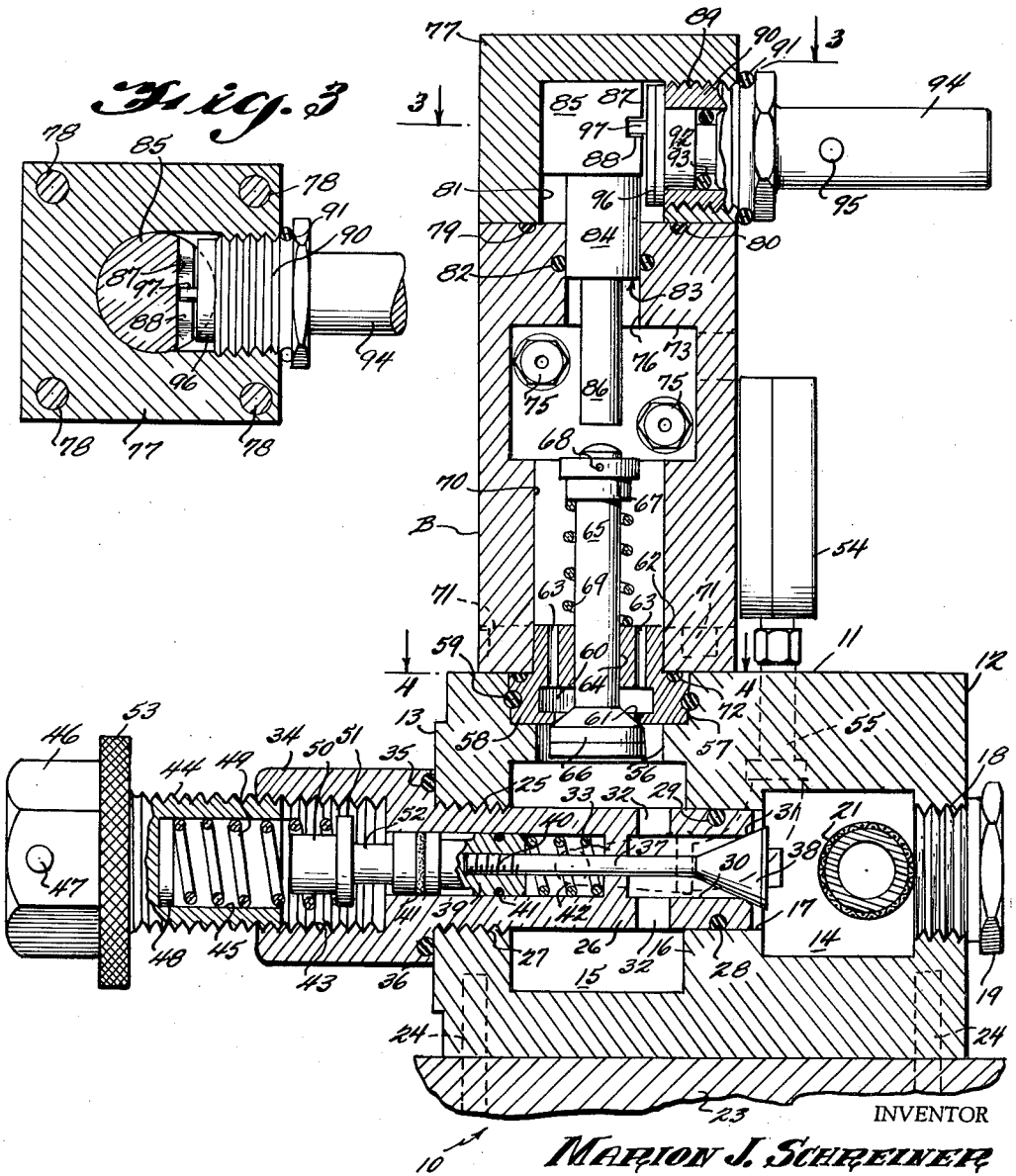
INVENTOR
MARION J. SCHREINER
BY Kimmel & Crowell
ATTORNEYS

United States Patent Office 3,053,273
Patented Sept. 11, 1962

3,053,273
METERING REGULATOR FOR ANHYDROUS
AMMONIA
Marion J. Schreiner, R.F.D. 2, Tiffin, Ohio
Filed Dec. 2, 1958, Ser. No. 777,695
1 Claim. (Cl. 137—505.13)

The present invention relates to metering regulators for anhydrous ammonia and particularly to such regulators used in the dispensing of anhydrous ammonia for fertilizing the soil.

The primary object of the invention is to provide a metering regulator for dispensing anhydrous ammonia in which a predetermined dispensing pressure is maintained.

Another object of the invention is to provide a metering regulator of the class described above in which hand controlled means are provided for interrupting the flow of anhydrous ammonia when desired.

A further object of the invention is to provide in a metering regulator for anhydrous ammonia means for manually controlling the dispensing pressure of the anhydrous ammonia.

A still further object of the invention is to provide a metering regulator for anhydrous ammonia which is compact, inexpensive to manufacture, simple to use and which is completely effective in its operation.

Other objects and advantages will become apparent in the following specification when considered in light of the attached drawings, in which:

FIGURE 1 is a perspective view of the invention;

FIGURE 2 is a vertical section taken on the line 2—2 of FIGURE 1, looking in the direction of the arrows;

FIGURE 3 is a horizontal section taken on the line 3—3 of FIGURE 2, looking in the direction of the arrows;

FIGURE 4 is a horizontal section taken along the line 4—4 of FIGURE 2, looking in the direction of the arrows; and FIGURE 5 is a vertical section taken on line 5—5 of FIGURE 2, looking in the direction of the arrows.

Referring now to the drawings in detail wherein like reference characters indicate like parts throughout the several figures, the reference numeral 10 indicates generally a metering regulator for anhydrous ammonia constructed in accordance with the invention.

The metering regulator 10 includes a generally rectangular body 11 having an inlet end 12 and an outlet end 13. An inlet chamber 14 is formed in the body 11, adjacent the inlet end 12 thereof, and an outlet chamber 15 is formed in the body 11 adjacent the outlet end 13 thereof.

A transverse partition 16 separates the inlet chamber 14 from the outlet chamber 15 and is provided with a bore 17 extending between the chambers 14 and 15.

A threaded clean-out bore 18 extends through the inlet end 12 of the body 11 in axially aligned relation to the bore 17. A clean-out plug 19 is removably seated in the threaded bore 18 normally closing the threaded bore 18.

An inlet port 20 opens through the side of the body 11 and communicates with the inlet chamber 14. A strainer, generally indicated at 21, overlies the inner end of the inlet port 20 to strain material passing therethrough. An inlet fitting 22 is threaded into the inlet port 20 to connect the inlet chamber 14 to a source of anhydrous ammonia under pressure.

The body 11 is secured to a base 23 by means of securing elements 24 and is arranged with the bores 17, 18 having their axes parallel to the base 23.

A threaded bore 25 extends through the body 11 at the outlet end thereof communicating with the outlet chamber 15. The bore 25 has its axis aligned with the axis of the bores 17, 18. An elongated tubular plug 26 extends through the threaded bore 25 and terminates in the bore 17. The plug 26 is threaded at 27 for cooperative engagement with the threaded bore 25, as best seen in FIGURE 2. An annular O-ring 28 is seated in an annular groove 29 formed in the outer end of the plug 26 to engage the bore 17 and seal the plug 26 therein. The plug 26 has an axial bore 30 extending inwardly thereof with the end opposite the threads 27 terminating in a valve seat 31. A plurality of ports 32 communicate the bore 30 with the outlet chamber 15. A partition 33 extends across the bore 30 between the threads 27 and the ports 32.

An enlarged cylindrical extension 34 is formed integrally on the outer end of the plug 26 and is provided with an annular groove 35 in the end thereof extending toward the body 11 to receive a sealing O-ring 36 which engages against the outlet end 13 of the body 11 to seal the plug 26 thereto. An elongated valve stem 37 is axially mounted in the bore 30 and is supported by the partition 33. A conical valve 38 is secured to the inlet end of the valve stem 37 to cooperate with the valve seat 31, as seen in FIGURE 2. A piston 39 is slidably mounted in the bore 30 between the cylindrical extension 34 and the partition 33 and is releasably secured to the valve stem 37 by threads 40. The piston 39 is provided with a pair of sealing O-rings 41 adjacent the opposite ends thereof to seal the piston 39 in the bore 30.

A coil spring 42 is positioned in the bore 30 between the partition 33 and the piston 39 to normally urge the piston 39 in a direction toward the cylindrical extension 34 to normally seat the valve 38 against the valve seat 31.

The cylindrical extension 34 has a threaded bore 43 extending axially therethrough aligned with and communicating with the bore 30. An adjusting stem 44 is threaded into the threaded bore 43 and is provided with an axial bore 45 communicating with the threaded bore 43. The threaded stem 44 has a head 46 on its outer end and is provided with a transversely extending handle 47 by means of which the threaded stem 44 may be adjusted with respect to the cylindrical extension 34. A washer 48 is seated in the inner end of the bore 45 and a coil spring 49 engages thereagainst and extends toward the inlet end 12 of the body 11. A cylindrical adapter 50 is engaged in the inlet end of the coil spring 49 and is provided with an annular shoulder 51 engaging against the inlet end of the spring 49.

The adapter fitting 50 has an axial extension 52 integrally formed therewith and engaging the piston 39. A lock nut 53 is threaded on the threaded stem 44 to provide means for locking the threaded stem 44 with respect to the cylindrical extension 34.

A pressure gauge 54 is connected to the outlet chamber 15 by means of piping 55 to give a continuous indiction of the pressure in the outlet chamber 15.

A bore 56 opens upwardly through the body 11 communicating with the outlet chamber 15 and having an enlarged upper end portion 57. A cylindrical plug 58 is seated in the enlarged end portion 57 of the bore 56 and sealed thereto by an annular sealing O-ring 59. The plug 58 has a central chamber 60 formed therein which is open at its lower end and provided with a valve seat 61. The plug 58 has a reduced cylindrical extension 62 projecting upwardly therefrom and having a plurality of bores 63 formed therein communicating with the chamber 60 and the upper end of the plug 58. The plug 58 has a central bore 64 positioned between the bore 63 and supporting an upright valve stem 65 therein for vertical sliding movement. The valve stem 65 has a valve 66 formed on its lower end cooperating with the valve seat 61 to normally close the lower end of the chamber 60. A collar 67 is secured to the upper end of the valve stem 65 by a securing pin 68 and a coil spring 69 encompasses the valve stem 65, engaging at one end the plug 58 and at the opposite end the collar 67 to normally bias the valve 66 in engagement with the valve seat 61.

A second generally rectangular body B is provided with a bore 70 extending upwardly therethrough with the bore 70 having its lower end engaged over the reduced extension 62 of the plug 58. A plurality of securing elements 71 secure the body B to the body 11 and a sealing O-ring 72 is seated in the plug 58 to engage the inner end of the body B to seal the body B with respect to the body 11. A manifold chamber 73 is formed in the body B communicating with the bore 70. A plurality of outlet ports 74 extend into the body B communicating with the manifold chamber 73. Outlet fittings 75 are arranged in each of the outlet ports 74 to provide a connection for a plurality of outlet conduits.

A bore 76 is formed in the body B in axial alignment with the bore 70 communicating with the manifold chamber 73 on the upper end thereof oppositely of the bore 70.

A generally rectangular cap 77 is secured to the upper end of the body B by a plurality of securing elements 78. The cap 77 engages against a sealing O-ring 79 positioned in an annular groove 80 in the upper end of the body B. A bore 81 opens upwardly in the cap 77 from the the lower face thereof communicating and axially aligned with the bore 76. The bore 76 is provided with a sealing O-ring 82 arranged annularly therein, for reasons to be assigned. A valve actuator, generally indicated at 83, is provided with a cylindrical central portion 84 slidably mounted in the bore 76 and sealed therein by the sealing O-ring 82. The valve actuator 83 has an upper semi-cylindrical portion 85 slidably mounted in the bore 81 and a lower cylindrical extension 86 projecting into the manifold chamber 73 to engage the valve stem 65. The upper extension 85 of the valve actuator 83 has a flat face 87 formed thereon in which a transverse groove 88 is formed.

A threaded bore 89 extends transversely of the cap 77 communicating with the bore 81 and an externally threaded bushing 90 is threaded into the threaded bore 89 and sealed against the cap 77 by a sealing O-ring 91. A shaft 92 is journalled in the bushing 90 and sealed thereto by a sealing O-ring 93. The shaft 92 has an external extension 94 through which a handle 95 is mounted to rotate the shaft 92 within the bushing 90. A disk 96 is integrally formed on the inner end of the shaft 92 and carries a cam pin 97 thereon projecting into the groove 88 so as to vertically reciprocate the valve actuator 83 upon rotation of the shaft 92. The valve actuator 83 is adapted to engage the valve stem 65 to move the valve 66 away from the seat 61, as desired by the operator.

The strainer 21 is engaged over a short tubular fitting 98 mounted in the inner end of the inlet port 20 and projecting into the inlet chamber 14. A threaded bore 99 is formed in the body 11 in opposite aligned relation to the inlet bore 20. A clean out plug 100 is threaded into the bore 99 and is sealed to the body 11 with an O-ring 101. The clean out plug 100 has a cylindrical recess 102 formed in its inner end communicating with the inlet chamber 14, a cylindrical thimble 103 is mounted in the recess 102 for reciprocation therein and has an annular flange 104 formed integrally on its outer end. The strainer 21 is cylindrical with one end mounted on the fitting 98 and the opposite end mounted on the thimble 103 engaging the flange 104. A coil spring 105 is positioned in the thimble 103 biasing the thimble 103 and the strainer 21 toward the fitting 98. The strainer 21 may be removed for cleaning by first removing the clean out plug 100.

The metering regulator 10 is of a relatively heavy metallic construction and will not freeze due to the expansion of the escaping anhydrous ammonia being metered into the ground. By adjusting the handle 47 and the stem 44 the pressure of the springs 42, 49 may be so balanced that the valve 38 will permit a desired flow of anhydrous ammonia gas from the inlet chamber 14 into the outlet chamber 15. The valve 38 can be adjusted so that the required pressure can be maintained in the outlet chamber 15 by checking the pressure gauge 54. With the correct pressure maintained in the outlet chamber 15 anhydrous ammonia can be dispensed to the outlet fittings 75 by rotating the shaft 92 and moving the valve actuator 83 into engagement with the stem 65 compressing the spring 69 and moving the valve 66 away from the seat 61. The anhydrous ammonia flows past the valve 66 into the chamber 60 and through the port 63 into the bore 70, and then into the outlet fittings 75.

The construction of applicant's invention provides a device which is completely safe in operation and which will deposit a known metered quantity of anhydrous ammonia in each acre of fertilized land in an inexpensive, practical manner. The present structure provides a quick operative spray on and off feature controlled by rotation of the shaft 92.

Having thus described the preferred embodiment of the invention, it should be understood that numerous structural modifications and adaptations may be resorted to without departing from the scope of the appended claim.

What is claimed is:

An anhydrous ammonia metering regulator comprising a body having adjacent inlet and outlet chambers therein, valve means controlling the flow from said inlet chamber to said outlet chamber, said valve means comprising a plug having a bore therein, a partition medially of said bore, a valve seat at one end of said bore, an elongated valve stem in said bore, a conical valve on said stem adjacent said valve seat, a piston in said bore connected to said valve stem, a spring interposed between said piston and said partition normally biasing said valve to closed position on said valve seat, an internally threaded extension on said plug, a hollow adjusting stem threaded in said extension, an adaptor in said adjusting stem engaging said piston, a spring engaging said adaptor and biasing said adaptor and hence said piston toward valve opening position, said last mentioned spring being less resilient than said first mentioned spring, an operating head on said adjusting stem, and a valve controlled outlet for said outlet chamber.

References Cited in the file of this patent

UNITED STATES PATENTS

| 1,757,715 | Hurlbrink et al. | May 6, 1930 |
| 2,058,951 | Buirk | Oct. 27, 1936 |
| 2,061,642 | Williamson | Nov. 24, 1936 |
| 2,169,514 | Buzzard et al. | Aug. 15, 1939 |
| 2,620,817 | Blaydes | Dec. 9, 1952 |
| 2,691,358 | Peck | Oct. 12, 1954 |
| 2,929,402 | Streeter | Mar. 22, 1960 |

FOREIGN PATENTS

| 56,825 | Sweden | 1924 |
| 555,393 | France | 1923 |
| 707,970 | Great Britain | 1954 |
| 1,169,916 | France | Sept. 15, 1958 |